June 19, 1956 — B. TAVOLA — 2,750,957
INJECTION VALVE
Filed March 26, 1952
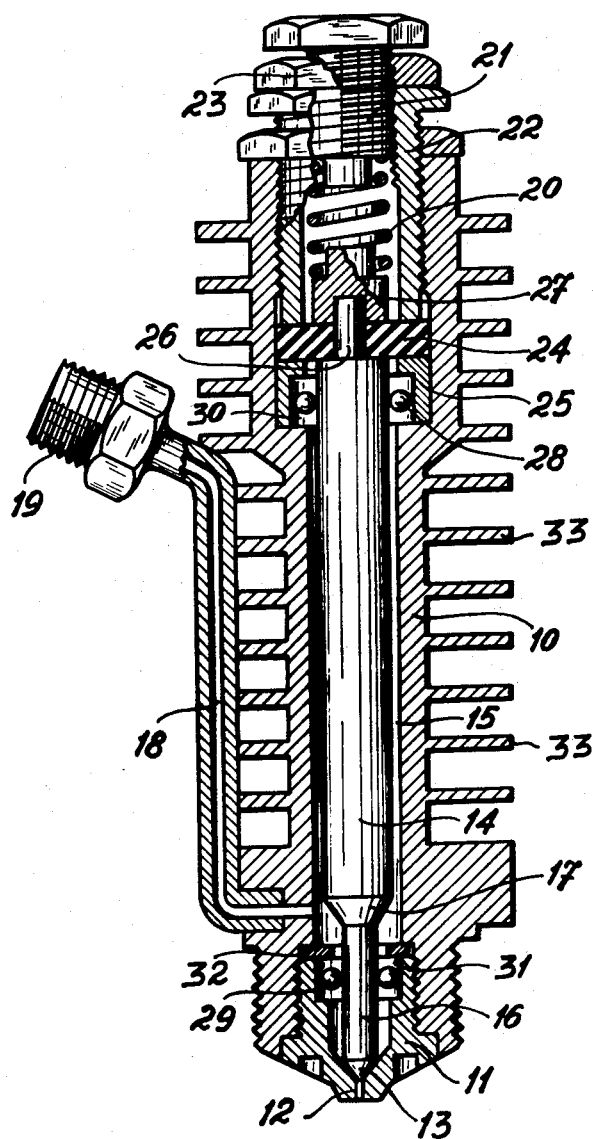
INVENTOR.
BRUNO TAVOLA
BY
Michael S. Striker
Agt.

United States Patent Office 2,750,957
Patented June 19, 1956

2,750,957

INJECTION VALVE

Bruno Tavola, Milan, Italy

Application March 26, 1952, Serial No. 278,547

Claims priority, application Italy April 10, 1951

2 Claims. (Cl. 137—510)

My present invention relates to an injection valve, and more particularly it relates to an injection valve intended for internal combustion engines of the type in which liquid fuel under high pressure is injected into combustion chambers of cylinders, wherein the said liquid fuel under high pressure is sprayed through a suitable nozzle in atomized form without the aid of compressed air, and wherein the combustion is attained by the combined effect of pressure and of atomization only or by the aid of suitable igniting devices.

Nothwithstanding the most perfect and very costly manufacture, assemblage and testing any injection valve constructed according to current art is subject to several common objections, besides costly and very difficult manufacture. In more detail, conventional devices of current type are subject to fast wearing, owing to the conditions of operation by which the surfaces of the valve stem and of the bearing passage are compelled to work at pretty high linear speed and at a very high friction and as a result of which no proper lubrication of said surfaces is possible; the above inconvenience is further made more serious in cases where no high grade fuel or no properly pure and filtered liquid fuel is available for running the engine, and in the case in which the engine is supplied with light liquid fuel, say regular automobile or aviation gasoline, light kerosene and the like, having poor or no lubricating properties.

The poor promptness of current devices of the type described to respond to the feeding cycle of operation of the injection pump prevents the use thereof in internal combustion engines designed to run at very high speed, i. e. in the cases in which the injection phase must be performed in a substantially instantaneous manner. Still further, formation of a thin film of liquid fuel between the surfaces in frictional relationship is practically unavoidable, and said occurrence makes the operation of the device irregular at the lowest and at the highest temperature conditions: in starting a very cold engine some difficulty may be encountered, for example, due to the stiffness of said film, which makes the known valve devices resistant to open or to close and sometimes stick, even though the valve device comprises a stem so loose inside the bearing passage that it leaks as the engine and the fuel became warmed up.

One object of the present invention is a new and improved injection valve device which is not subject to the common objections referred to above, and which comprises bearing means for slidably supporting the stem in a quite slidable manner into and through the valve body, this bearing means including no surfaces in frictional relationship, and including sealing means whose tightness does not depend upon the perfect adjustment of surfaces in frictional relationship. It is therefore a principal object of the invention to provide a new and improved injection valve which is promptly responsive to the feeding cycle of the injection pump under any practical working condition and which does not leak irrespective of the liquid fuel fed thereinto.

Another object of the invention is to provide a new and improved injection valve device which resists wear even though poor or improperly filtered fuel is fed thereinto.

A further object of the invention is to provide a new and improved injection valve device of the character described which comprises few and relatively simple parts, and therefore which is relatively cheaper to manufacture than the devices of current type heretofore produced.

A construction designed to carry out the invention will be hereinafter described together with other features of the invention.

The invention will be more readily understood from a reading of the following detailed specification taken in conjunction with the accompanying drawing, wherein an example of the invention is shown in a sectional view taken in the plane including the axis of the valve stem.

Throughout the following description, with reference to the accompanying drawing wherein the device according to the invention is shown in a vertical position and its end portion designed to be fitted through the cylinder wall is positioned at the lower part of the drawing, the expressions "lower" and "upper" will be used to indicate parts, members and features which will appear in correspondingly lower or upper positions in the drawing, it being however obvious to those skilled in the art that the device which will be hereinafter described might be arranged and operated in positions other than the one shown in the accompanying drawing, in an inclined or in inverted position, for example, according to the various requirements of mounting the device in the wall of internal combustion engines of different types.

Referring now to the drawing the valve body is illustrated at 10. In axial relationship therewith and in the lower portion thereof a nearly conventional injection nozzle member 11 is tightly fitted in any suitable manner, by threaded engagement, for example, and it is provided with suitable passages 12 through which the injected jet is sprayed and atomized in the cylinder's combustion chamber (not shown), the said passages 12 being kept closed by a valve member formed by the lower conical end 13 of a stem 14, the said conical end abutting in a leak-proof manner on a correspondingly conical seat made in the inner portion of said injection nozzle member 11. The features of the lower portion of said injection nozzle 11, such as the atomizing passages and the closing means thereof, do not form subject matter of this invention, and therefore the said features are shown in a rather simplified manner and may be constructed by applying current knowledge in the art in several different shapes and according to different methods to meet the various requirements of different practical uses of the device.

According to this invention, the stem 14 is arranged in an axial chamber 15 of valve body 10, and it is provided with a lower portion 16 of lesser diameter, a middle frusto-conical portion 17 being provided for connecting the cylindrical surfaces of said portion 16 to the cylindrical surface of main portion 14 of the stem. The said chamber 15 communicates with a duct 18 having an outer end provided with a suitable coupling means 19 of any conventional type for connecting said duct to the pipe (not shown) through which the pressurized fuel is fed by any suitable injection pump (not shown) to the said chamber 15. According to current practice, the said stem 14, 16 is urged by spring means in a direction which causes the lower conical end 13 of said stem to abut on its seat in said injection nozzle 11 for keeping closed the atomizing passages thereof. In the form of embodiment shown in the accompanying drawing the said spring means is illustrated at 20 in form of a compression coil spring the upper end of which abuts on the lower face of a threaded plug 21 threadedly connected into an inner and outer threaded tubular member 22, which in turn is threadedly fitted into the inner threaded upper portion of valve body 10. From the above and from a consideration of the drawing it will be readily understood that the load of spring 20 may be easily adjusted by screwing in or by screwing out the plug 21, to increase or decrease the load, respectively. A suitable nut 23 may be provided, as shown, to make fast the position at which the said plug 21 is set as the adjusting operation is completed.

According to the most important feature of the invention, an annular member 24 made of resilient material is provided to form the upper wall of chamber 15 in which the pressurized fuel is fed, the said annular resilient member 24 being made of plain or synthetic rubber, resilient plastics, poly-ethylene plastics, and so on, the type and the character of said material being obviously a simple matter of choice, provided that the characteristics of the chosen material, in view of its resiliency and of its resistance to chemical and physical action of the fluid to be injected, meet the specific requirements of operation. Other resilient materials which the most advanced chemistry may or will produce might be advantageously used in the construction of said member 24. In the preferred form of embodiment shown, the said annular resilient member 24 is arranged about an upper extension 26 of said stem 14, 16, of lesser diameter than the main portion 14 thereof, and preferably very closely thereabout. The peripheral or outer portion of said annular resilient member 24 fits on the inner surface of said valve body 10, and preferably closely thereto, and it is axially squeezed between the upper surface of an annular member 25 abutting at its lower surface on a step provided in valve body 10 and the lower end of said tubular member 22, the squeezing of said outer portion of said annular resilient member 24 being performed simply by tightly screwing said tubular member 22 into the upper portion of said valve body 10. In its turn, the inner portion of same annular resilient member 24, i. e. the portion thereof which encircles the said upper extension 26 of stem, is squeezed between a step formed in said stem between said main portion 14 thereof and its extension 26 of lesser diameter, and the lower face of an inner plug 27 on which the said coil spring 20 abuts at its lower end, the squeezing of said inner portion of said annular resilient member 24 being caused by the load of same coil spring 20.

Owing to the above described arrangement of parts and members, the outer portion of said annular resilient member 24 is in sealing engagement with the said valve body 10, which houses the assembly of the whole injection valve device, and thereby no leakings may occur between the said body 10 and the said annular resilient wall forming member 24. Likewise, by the described arrangement, the inner portion of annular resilient member 24 is in sealing engagement with the said stem 14 and, more specifically, with the upper portion thereof, the said stem forming part of the movable assembly designed to respond to the feeding cycle of the injection pump and to cyclically open and close the atomizing passages of the device, and likewise no leakings may occur between said wall forming member 24 and said upper portion of stem 14.

Further, parts 27 and 14, on the one hand, and the parts 25 and 22, on the other hand, are in co-axial but spaced relationship, so that the said wall forming annular resilient member 24 comprises an intermediate portion which is not squeezed or in any way in contacting relationship with rigid members or parts, and therefore, the said intermediate portion may be subject to some bending or deformation to the extent allowed by the resiliency thereof, as necessary to allow the operation of the valve stem.

It will be readily understood that in a device as above described there are no parts which may be subject to wearing out, and that the construction of the described means for sealing the chamber does not require precise manufacture, adjustment and assemblage. Even though the said annular wall forming resilient member 24 might be considered as subject to wear, owing to its repeated deformations during the operation of the device, it will be obvious that replacement of said member with a new one is matter of simple operation and that a resilient member 24 of the type described is an article which may be cheaply produced.

To have the stem 14, 16 guided in a fixed axial path in respect to valve body 10 I provide an upper ring of balls 28 and a lower ring of balls 29, encircling the cylindrical surface of upper part of main portion 14 of said stem and the cylindrical surface of lower portion 16 thereof, respectively, and in contacting relationship therewith. The said upper ring of balls 28 and the said lower ring of balls 29 are arranged in annular upper and lower recesses 30 and 31, respectively. The said upper recess 30 is formed by the annular member 25 which is provided with an inturned flange forming upper portion and by the up-facing step formed into the said valve body 10 on which the said annular member 25 abuts, as referred to above. The said lower recess 31 is formed within the upper portion of injection nozzle member 11, provided with an inner part of larger diameter, the step formed within said nozzle member by the said difference of diameter forming the lower wall of said recess 31, the upper wall of which is formed by a ring member 32 abutting on the upper edge of said nozzle member 11.

The difference of diameters of the inner cylindrical surfaces of the said recess forming parts and of the said portions 14 and 16 of the stem is designed to form an annular space in which the said balls 28 and 29 are precisely arranged in contacting rotatable relationship with said surfaces. The spacing between the upper and lower wall forming parts of said recesses is designed to allow a certain movement of said balls 28 and 29 in a direction parallel to the axis of said stem. In the actual construction of a device as above, the said spacing is slightly greater than the diameter of the balls, in view of the fact that in actual operation the axial travel of the stem is very small.

From the above it will be further understood that I provide an arrangement of parts and members which produces a perfect guiding of the stem in respect to the valve body, by using means which owing to the well known characteristics of rolling bearing means, and in particular of ball bearing means, operates very satisfactorily even though in defective condition of lubrication, no frictional resistance occurring between relatively movable parts.

From the above it will be further readily understood that the above described provision of guiding means of ball-bearing type will allow the arrangement of the lower one thereof in a position very near to the conical lower end of the stem, i. e. to the portion of the stem which is designed to co-operate with the seat of the injection nozzle for closing the same in the time comprised between any two subsequent injection cycles, so that the said lower end of the stem will be surely maintained in its co-operative position in respect to said seat, the said guiding means of ball-bearing type allowing free passage of the pumped fluid therethrough.

Further, the above described construction and arrangement of guiding means may exert a very efficient guiding effect, in view of the fact that the stem is movably supported and axially guided by means arranged in largely spaced relationship and, is more specifically, by means acting on the stem in two positions near to lower and upper ends thereof.

Still further, a construction as above described does not require costly and difficult grinding of internal surfaces of small diameter and substantial length, as injection valves constructed according to current art do. In a construction substantially as above, precise grinding is required for the external surfaces of portions 14 and 16 of the stem and of inner cylindrical short surfaces of annular member 25 and of nozzle member 11 only, the latter being however an article that at any rate requires a very precise workmanship, owing to the provision of the valve seat and of the atomizing passages.

In consideration of the fact that the resilient material of the above described wall forming annular member 24 might be damaged by intense heat, and of the fact that the lower portion of the valve body 10 is intended to be tightly screwed into the cylinder wall of an internal combustion engine, i. e. into a metallic part subject to intense heat, the valve body of a device according to my invention may advantageously be provided with a plurality of heat dispersing fins 33, so as to cool the middle and upper portion of said valve body down to a temperature which will not adversely affect the said material.

The foregoing description of the invention is explanatory thereof and various changes in the size, shape and materials as well as in the details and arrangements of the illustrated construction may be made, within the scope of the appended claims, without departing from the spirit of the invention. As a further example, the rolling guiding means illustrated and described above in form of rings of balls may be substituted by a plurality of cylindrical rollers or of other rotating bodies, provided that at least three rotating bodies are arranged about the stem to produce an efficient guiding means. Other modifications and changes will be obvious to those skilled in the art.

Still further, while I have described and shown a preferred embodiment designed and intended to be used as an injection valve for internal combustion engines of the so called "diesel" type, it will be apparent that a device wholly or partly comprising the above features may be advantageously used in combination with engines other than the one referred to above, in combination with a turbo-jet engine for injecting fuel, in the combustion chambers thereof, for example. Consequently, while I have been herein described but a single embodiment, the invention is not intended to be limited thereto, and other embodiments and modifications incorporating one or more of any advantageous feature and of any novel function of the form herein disclosed will be apparent to those skilled in the art, and therefore said embodiments and modifications should and are intended to be comprehended in the range and field of equivalents of the subject matter of this application as defined by the appended claims.

Having thus described the invention, what I claim as new and desire to have protected by Letters Patent is:

1. In a valve device, in combination, a tubular housing means having an inner wall surface and an annular step portion projecting inwardly from said inner wall surface; an annular seat member in said tubular housing means comprising a tubular sleeve engaging said inner wall surface and resting on said annular step portion, said tubular sleeve having an annular flange extending inwardly from said inner wall surface and defining a central opening; a resilient deformable plate member arranged in said tubular housing means extending across the interior thereof and seated with one face on said annular flange of said seat member; an elongated valve member mounted in the interior of said tubular housing means extending along the axis thereof and adapted to reciprocate therein along said axis, said elongated valve member passing through said central opening of said annular seat member and having a portion engaging said one face of said plate member; roller means arranged in said tubular housing means in the central opening of said annular seat member in rolling engagement with said elongated valve member and said tubular sleeve of said seat member and axially movable between said annular step portion of said tubular housing means and said annular flange of said seat member for guiding the axial reciprocation of said valve member; resilient means in said tubular housing means pressing against the opposite face of said resilient deformable plate member centrally thereof; and elongated annular retaining means mounted in said tubular housing means around and spaced radially from said resilient means and having one end in contact with and pressed against said opposite face of said plate member, whereby said plate member is fluid-tightly held between said resilient means and said portion of said valve member, and between said retaining means and said annular seat member, to provide respective seals therebetween.

2. In a valve device, in combination, a tubular housing means having an inner wall surface and an annular step portion projecting inwardly from said inner wall surface; an annular seat member in said tubular housing means comprising a tubular sleeve engaging said inner wall surface and resting on said annular step portion, said tubular sleeve having an annular flange extending inwardly from said inner wall surface and defining a central opening; a resilient deformable plate member arranged in said tubular housing means extending across the interior thereof with its periphery tightly engaging said inner wall surface of said tubular housing means and seated with one face on said annular flange of said seat member, said plate member being formed with an aperture passing therethrough between its opposite sides; an elongated valve member mounted in the interior of said tubular housing means extending along the axis thereof and adapted to reciprocate therein along said axis, said elongated valve member passing through said central opening of said annular seat member and having at the end thereof an attenuated projection of substantially the same diameter as said aperture in said plate member projecting axially from the end of said valve member and extending through said aperture tightly fitting therein, said valve member having at the base of said projection a surface portion transverse its longitudinal axis abutting said one face of said plate member around said aperture therein; ball bearing means arranged in said tubular housing means in the central opening of said annular seat member in rolling engagement with said elongated valve member and said tubular sleeve of said seat member and axially movable between said annular step portion of said tubular housing means and said annular flange of said seat member for guiding the axial reciprocation of said valve member; resilient means in said tubular housing means pressing against the opposite face of said resilient deformable plate member centrally thereof; and elongated annular retaining means mounted in said tubular housing means around and spaced radially from said resilient means and having one end in contact with and pressed against said opposite face of said plate member, said retaining means adjustably engaging said tubular housing means for axial adjustment therein, whereby said plate member is fluid-tightly held between said resilient means and said transverse surface portion of said valve member, and between said retaining means and said annular seat member, to provide respective seals therebetween.

References Cited in the file of this patent

UNITED STATES PATENTS

| 1,642,412 | Farnsworth | Sept. 13, 1927 |
| 1,814,443 | Goldbert | July 14, 1931 |
| 1,853,156 | Sobon | Apr. 12, 1932 |
| 1,878,749 | Abramson | Sept. 10, 1932 |
| 1,990,875 | Mock | Feb. 12, 1935 |
| 2,594,786 | Meincke | Apr. 29, 1952 |
| 2,602,627 | Britton | July 8, 1952 |

FOREIGN PATENTS

| 69,048 | Switzerland | Dec. 24, 1913 |
| 488,937 | Germany | Jan. 9, 1930 |
| 161,397 | Switzerland | Apr. 30, 1933 |
| 777,261 | France | Nov. 26, 1934 |